United States Patent [19]

Ohnari et al.

[11] Patent Number: 5,241,000
[45] Date of Patent: Aug. 31, 1993

[54] CURABLE RESIN AND COMPOSITION CONTAINING THE SAME

[75] Inventors: Hideyuki Ohnari, Takasago; Toshiro Nambu; Hirotoshi Kawaguchi, both of Kobe; Yoshihiko Okimura, Takasago; Hisao Furukawa, Kobe, all of Japan

[73] Assignee: Kanegafuchi Kagaku Kogyo Kabushiki Kaisha, Osaka, Japan

[21] Appl. No.: 772,291

[22] Filed: Oct. 7, 1991

[30] Foreign Application Priority Data

Oct. 9, 1990 [JP] Japan .................. 2-271903

[51] Int. Cl.$^5$ .......................... C08L 83/16
[52] U.S. Cl. .................. 525/102; 525/100; 525/446; 525/440; 525/415; 528/26; 528/28
[58] Field of Search ............ 525/100, 446, 440, 102, 525/415; 528/26, 28

[56] References Cited

U.S. PATENT DOCUMENTS

| | | | |
|---|---|---|---|
| 4,334,036 | 6/1982 | Yonezawa et al. | 525/102 |
| 4,429,082 | 1/1984 | Lee et al. | 525/426 |
| 4,430,486 | 2/1984 | Chang et al. | 525/44 |
| 4,652,610 | 3/1987 | Dowbenko et al. | 525/100 |
| 4,789,710 | 12/1988 | Furukawa et al. | 525/440 |
| 4,837,274 | 6/1989 | Kawakubo et al. | 525/100 |

Primary Examiner—Ralph H. Dean, Jr.
Attorney, Agent, or Firm—Varndell Legal Group

[57] ABSTRACT

The curable resin having a number average molecular weight of 600 to 6000 and at least two hydrolyzable silyl groups which is prepared by reacting an aliphatic polyester resin having acryloyl group and alcoholic hydroxyl group with an isocyanate silane compound:

$$OCN-R^1-\underset{\underset{X_m^1}{|}}{Si}(R^2)_{3-m} \quad (I)$$

reacting the obtained reaction product with an aminosilane compound:

$$H_2N-R^3-\underset{\underset{X_n^2}{|}}{Si}(R^4)_{3-m}$$

and reacting the obtained reaction product with a monofunctional isocyanate: OCN-R$^5$ and/or a polyfunctional isocyanate; and the composition containing the resin. The curable resin and the composition are excellent in acid resistance such as acid resin resistance, scratch resistance, solvent resistance, flexibility, and the like.

10 Claims, 3 Drawing Sheets

CURABLE RESIN AND COMPOSITION CONTAINING THE SAME

BACKGROUND OF THE INVENTION

The present invention relates to a curable resin and a composition containing the same, and more particularly to a curable resin whose main chain consists essentially of an aliphatic polyester chain and which has on the polymer chain end at least two hydrolyzable silyl groups, and the composition containing the same.

The present invention provides a curable resin which is excellent in flexibility, solvent resistance, resistance to acid rain (acid rain resistance), resistance to scratch (scratch resistance), and is low in viscosity, and a composition containing the above-mentioned resin. The curable resin of the present invention is suitable for use as a base resin used in coatings, adhesives, sealing agents and potting agents, or as a polymer to be blended with a cellulose such as nitrocellulose or cellulose acetate butyrate, another polymer such as an epoxy resin, a polyester, an alkyd resin or an acrylic polyol, particularly a hydrolyzable silyl group-containing vinyl resin disclosed in, for instance, Japanese Unexamined Patent Publication No. 54-36395, and the like.

In a field that a curable resin is used in the state of a solution, particularly in a field of a coating, it is desired to prepare a high solid coating material which can be conformed to effluent regulations to solvents, for instance, prescribed in VOC Regulation provided in United States of America.

On the other hand, as to qualities to top coatings required in a market, particularly as to qualities of coatings for automobiles, it is desired to obtain an improved appearance due to intentions by user that goods of high grade are desired, it is desired to improve a scratch resistance, namely outside parts of an automobile are not scratched in a car washer, or it is desired to improve an acid rain resistance, derived from the environmental pollution.

As to melamine coatings which are generally used at the present time, in order to obtain a high solid coating, some efforts have been exerted. However, when a mixing ratio of a melamine resin component having a low viscosity is increased in the coating composition for obtaining a high solid coating, an acid resistance and a scratch resistance are further lowered. Also, an acid resistance and a scratch resistance of a regular solid coating are not necessarily attained to a satisfactory level.

An object of the present invention is to provide a curable resin which is improved in flexibility, solvent resistance, acid rain resistance and scratch resistance and is low in viscosity, and which is suitable for use of a blend with another resin.

A further object of the present invention is to provide a composition containing the above-mentioned resin which is improved in flexibility, solvent resistance, acid rain resistance and scratch resistance.

These and other objects of the present invention will become apparent from the description hereinafter.

SUMMARY OF THE INVENTION

It has now been found that a resin whose main chain comprises an aliphatic polyester and which has on the polymer chain end a hydrolyzable silyl group is low in viscosity and a cured product thereof is excellent in scratch resistance, flexibility, solvent resistance and acid rain resistance.

In accordance with the present invention, there is provided a curable resin having a number average molecular weight of 600 to 6000 and at least two hydrolyzable silyl groups in one molecule, which is prepared by (i) reacting an aliphatic polyester resin (A) having, in one molecule, both acryloyl group and alcoholic hydroxyl group on the polymer ends with an isocyanate silane compound (B) having the formula (I):

wherein $R^1$ is a bivalent hydrocarbon group having 1 to 10 carbon atoms selected from an alkylene group, an arylene group and an aralkylene group, $R^2$ is an alkyl group having 1 to 10 carbon atoms, each $X^1$ is a hydrolyzable group and m is 1, 2 or 3 to give a reaction product (i);

(ii) reacting the obtained reaction product (i) with an aminosilane compound (C) having the formula (II):

wherein $R^3$ is a bivalent hydrocarbon group having 1 to 10 carbon atoms selected from an alkylene group, an arylene group and an aralkylene group, $R^4$ is an alkyl group having 1 to 10 carbon atoms, each $X^2$ is a hydrolyzable group and n is 1, 2 or 3 to give an aminosilane-modified resin (ii), and (iii) reacting the aminosilane-modified resin (ii) with a monofunctional organic isocyanate compound (D-1) having the formula (III):

wherein $R^5$ is a monovalent hydrocarbon group having 1 to 25 carbon atoms selected from an alkyl group, an aryl group and an aralkyl group, a group of the formula: $(CH_3O)_3Si-(CH_2)_3$ or a group of the formula: $(C_2H_5O)_3Si-(CH_2)_3$ and/or a polyfunctional organic isocyanate compound (D-2) in the substantial absence of water.

Also, in accordance with the present invention, there is provided a composition comprising the above-mentioned curable resin (b) and a silyl group-containing vinyl polymer (a) having, in one molecule, at least one silyl group having the formula (IV):

wherein $R^6$ and $R^7$ are the same or different and each is a hydrogen atom or a monovalent hydrocarbon group having 1 to 10 carbon atoms selected from an alkyl group, an aryl group and aralkyl group, each Y is a halogen atom, an alkoxy group, an acyloxy group, an aminoxy group, a phenoxy group, a thioalkoxy group or an amino group, and at least one Y is an alkoxy group or a phenoxy group, and a is 1, 2 or 3.

DETAILED DESCRIPTION

In the present invention, firstly, the aliphatic polyester resin (A) having both acryloyl group and alcoholic hydroxyl group in one molecule is reacted with the isocyanate silane compound (B).

In the present invention, any aliphatic polyester resins can be used as the component (A) without any limitation, so long as the aliphatic polyester resin has both acryloyl group and alcoholic hydroxyl group at the polymer ends and has a number average molecular weight of 200 to 5,000, preferably from 300 to 3,000.

Examples of the polyester chain of the aliphatic polyester resin (A) are, for instance, a polyester such as polyethylene adipate, polydiethylene adipate, polypropylene adipate, polytetramethylene adipate, polyneopentylene adipate, polymethylpentanediol adipate, poly-ε-caprolactone or polymethylvalerolactone, a copolyester, a polyhexamethylene carbonate, and the like. Among them, poly-ε-caprolactone and polymethylvalerolactone are preferable from the viewpoint of weatherability, and polymethylvalerolactone is preferable from the viewpoint of acid rain resistance. Examples of the aliphatic polyester resin (A) are, for instance, poly-ε-caprolactone acrylates such as "Placcel FA-1" commercially available from Daicel Chemical Industries, Ltd., "Placcel FA-2", "Placcel FA-3", "Placcel FA-4", "Placcel FA-8", polymethylvalerolactone acrylates commercially available from Kabushiki Kaisha Kuraray, and the like.

The isocyanate silane compound (B) has the formula (I):

$$OCN-R^1-Si-X_m^1 \quad | \quad (R^2)_{3-m} \tag{I}$$

In the formula (I), $R^1$ is a bivalent hydrocarbon group having 1 to 10 carbon atoms, concretely, an alkylene group having 1 to 10 carbon atoms such as trimethylene group, hexamethylene group, including a cycloalkylene group having 6 to 10 carbon atoms such as cyclohexylene group, in addition to the linear or branched alkylene group, an arylene group having 6 to 10 carbon atoms such as phenylene group or an aralkylene group having 7 to 10 carbon atoms such as xylylene group, $R^2$ is an alkyl group having 1 to 10 carbon atoms such as methyl group or ethyl group, each $X^1$ is a hydrolyzable group, and m is 1, 2 or 3. Examples of the hydrolyzable group $X^1$ are, for instance, a halogen atom, an alkoxy group such as methoxy group, ethoxy group or butoxy group, an acyloxy group such as acetoxy group, an aminoxy group, a phenoxy group, a thioalkoxy group, an amino group, and the like. Among them, the alkoxy group and the acyloxy group are preferable from the viewpoints of the safety and smelling.

Examples of the isocyanate silane compound (B) are, for instance, 3-isocyanatepropyltrimethoxysilane, 3-isocyanatepropyltriethoxysilane, 3-isocyanatepropylmethyldimethoxysilane, and the like.

It is preferable that the isocyanate silane compound (B) is reacted with the aliphatic polyester resin (A) in an amount of 0.3 to 1.0 mole, more preferably from 0.6 to 1.0 mole, per mole of the alcoholic hydroxyl group in the aliphatic polyester resin (A). When the amount of the isocyanate silane compound (B) is less than 0.3 mole per mole of the alcoholic hydroxyl group in the polyester resin (A), the non-reacted hydroxyl groups numerously remain, thus the storage stability tends to lower. On the other hand, when the amount of isocyanate silane compound (B) is more than 1.0 mole, there is a tendency that the non-reacted isocyanate silane compound (B) remains.

The reaction of the aliphatic polyester resin (A) and the isocyanate silane compound (B) can be conducted at a temperature of room temperature to 200° C. for 0.5 to 5 hours in the substantial absence of water, and the reaction can easily proceed under the above-mentioned reaction conditions.

In the above-mentioned reaction, as a catalyst, an organotin catalyst such as dibutyltin dilaurate, tin octoate or stannous octoate can be used. Also, in order to inhibit the radical polymerization of acryloyl group in the aliphatic polyester resin (A) during the reaction, it is preferable to add a polymerization inhibitor such as hydroquinone, hydroquinone monomethyl ether or 2,6-ditert-butyl-4-methylphenol (BHT) prior to the reaction.

Thus, the reaction product (i) having urethane bond formed by the reaction of hydroxyl group in the component (A) with isocyanato group in the component (B) can be obtained (urethane bond formation).

Subsequently, the reaction product (i) is reacted with the aminosilane compound (C) having the formula (II):

$$H_2N-R^3-Si-X_n^2 \quad | \quad (R^4)_{3-m} \tag{II}$$

In the reaction, acryloyl group in the reaction product (i) is reacted with amino group in the aminosilane compound (C).

In the formula (II), $R^3$ is a bivalent hydrocarbon group having 1 to 10 carbon atoms, concretely, is an alkylene group having 1 to 10 carbon atoms such as trimethylene group or hexamethylene group, including a cycloalkylene group having 6 to 10 carbon atoms such as cyclohexylene group, in addition to the linear or branched alkylene group, an arylene group having 6 to 10 carbon atoms such as phenylene group or an aralkylene group having 7 to 10 carbon atoms such as xylylene group, $R^4$ is an alkyl group having 1 to 10 carbon atoms such as methyl group or ethyl group, each $X^2$ is a hydrolyzable group, and n is 1, 2 or 3. Examples of the hydrolyzable group $X^2$ are, for instance, a halogen atom, an alkoxy group such as methoxy group, ethoxy group or butoxy group, an acyloxy group such as acetoxy group, an aminoxy group, a phenoxy group, a thioalkoxy group, an amino group, and the like. Among them, the alkoxy group and the acyloxy group are preferable from the viewpoints of the safety and smelling.

Examples of the aminosilane compound (C) are, for instance 3-aminopropyltrimethoxysilane, 3-aminopropyltriethoxysilane, 3-aminopropylmethyldimethoxysilane, and the like.

It is preferable that the aminosilane compound (C) is reacted with the reaction product (i) in an amount of 0.7 to 1 mole, more preferably from 0.8 to 1 mole, per mole of acryloyl group in the reaction product (i). When the amount of the aminosilane compound (C) is less than 0.7 mole per mole of acryloyl group in the reaction product (i), the non-reacted acryloyl groups remain, thus the curability of the curable resin tends to lower. On the other hand, when the amount of the aminosilane compound (C) is more than 1 mole, there is a tendency that the non-reacted aminosilane compound remains.

The reaction is conducted, for instance, at a temperature of 10° to 100° C. for 0.5 to 2 hours.

In the above-mentioned reaction, 5 to 90% by mole of the aminosilane compound (C) can be replaced by a mercaptosilane compound such as γ-mercaptopropyltrimethoxysilane.

Thus, the aminosilane-modified resin (ii) is obtained by the addition reaction of amino group in the component (C) to acryloyl group in the reaction product (i) (Michael addition reaction).

Finally, amino group in the thus obtained reaction product, namely, the aminosilane-modified resin (ii) is reacted with the monofunctional organic isocyanate compound (D-1) and/or the polyfunctional organic isocyanate compound (D-2).

The monofunctional organic isocyanate compound (D-1) has the formula (III):

$$OCN-R^5 \quad (III)$$

In the formula (III), $R^5$ is an alkyl group having 1 to 25 carbon atoms such as hexyl group, octyl group, dodecyl group or stearyl group, including a cycloalkyl group having 6 to 25 carbon atoms such as cyclohexyl group, in addition to the linear or branched alkyl group, an aryl group having 6 to 25 carbon atoms such as phenyl group, an aralkyl group having 6 to 25 carbon atoms such as benzyl group, the group of the formula: $(CH_3O)_3Si\text{-}(CH_2)_3$  or the group of the formula: $(C_2H_5O)_3Si\text{-}(CH_2)_3$.

Examples of the monofunctional isocyanate compound (D-1) are, for instance, n-butyl isocyanate, n-dodecyl isocyanate, stearyl isocyanate, cyclohexyl isocyanate, phenyl isocyanate, benzyl isocyanate, 3-isocyanatepropyltrimethoxysilane, 3-isocyanatepropyltriethoxysilane, 3-isocyanatepropylmethyldimethoxysilane, and the like.

Any polyfunctional organic isocyanate compound (D-2) can be used without particular limitations so long as the isocyanate compound (D-2) has at least two isocyanato groups in one molecule. The preferable polyfunctional isocyanate compounds (D-2) are isocyanate compound having 2 to 3 isocyanato groups in the molecule.

Typical examples of the polyfunctional organic isocyanate compound (D-2) are, for instance, hexamethylene diisocyanate, isophorone diisocyanate, 2,4-toluene diisocyanate, diphenylmethane-4,4'-diisocyanate, dicyclohexylmethane-4,4'-diisocyanate, xylylene diisocyanate, lysine methyl ester diisocyanate, a trimer of isophorone diisocyanate (isocyanurate), and the like.

When the curable resin of the present invention is used in exterior coatings, the use of the aliphatic isocyanate or alicyclic isocyanate is preferable to the use of the aromatic isocyanate, from the viewpoints of the weatherability and yellowing resistance. When a hydrolyzable silyl group-containing monofunctional isocyanate such as 3-isocyanatepropyltrimethoxysilane is used as the component (D-1), one of the hydrolyzable silyl group is further introduced into the curable resin. Also, when the polyfunctional organic isocyanate compound (D-2) such as a difunctional isocyanate is used, two molecules of the aminosilane-modified resins (ii) can be bonded. Accordingly, the monofunctional organic isocyanate compound (D-1) and the polyfunctional organic isocyanate compound (D-2) can be suitably used alone or as a mixture thereof depending on the purposes.

It is preferable that the isocyanate compound (D-1) or (D-2) is reacted with the aminosilane-modified resin (ii) in an amount of 0.7 to 1 gram-equivalent, more preferably from 0.8 to 1 gram-equivalent, of active hydrogen of amino group in the aminosilane-modified resin (ii). When the amount of the isocyanate compound is less than 0.7 gram-equivalent of active hydrogen of amino group in the aminosilane-modified resin (ii), the storage stability (the increase of viscosity due to moisture) and the yellowing resistance tend to lower. On the other hand, when the amount of the isocyanate compound is more than 1.0 gram-equivalent, there is tendency that the free isocyanate remains.

The reaction is conducted in the substantial absence of water, and it can easily and exothermically proceed by only adding the monofunctional isocyanate (D-1) and/or the polyfunctional isocyanate (D-2) to the aminosilane-modified resin (ii) or a solution containing the resin (ii) at a temperature of room temperature to 60° C.

As mentioned above, the curable resin of the present invention is prepared by a series of addition reactions (urethane bond formation→Michael addition reaction-→urea bond formation). It is not required to remove the eliminated product in each addition reaction from the reaction mixture, and the desired curable resin can be easily obtained by controlling the amounts of the reactants and the reaction temperature.

In the above-mentioned reactions, it is not necessary to use a solvent. In order to control the reaction temperature or the viscosity, a solvent can be used. As the solvent, a solvent having no active hydrogen such as heptane, toluene, xylene, butyl acetate or methyl ethyl ketone is used. Particularly, if a raw material contains water, it is possible to previously remove water according to azeotropic dehydration, using heptane or toluene.

The thus obtained curable resin has, in one molecule, the aliphatic polyester chain, at least one, preferably from 1 to 3, urethane bond and at least one, preferably from 1 to 3, N,N,N'-3-substituted urea bond in its backbone and has at least two, preferable from 2 to 6, more preferably from 2 to 4, hydrolyzable silyl groups at the polymer ends.

The curable resin has the number average molecular weight of 600 to 6000, preferably from 700 to 4000. When the number average molecular weight is less than 600, the flexibility becomes poor. On the other hand, when the number average molecular weight is more than 6000, the acid resistance and the scratch resistance become poor.

The curable resin of the present invention is excellent in flexibility due to the aliphatic polyester chain, is excellent in solvent resistance due to the urethane bond and the N,N,N'-3-substituted urea bond, is low in resin viscosity though it has the bonds with high cohesion, and is excellent in compatibility with another polymer. Accordingly, the curable resin of the present invention is most useful as a high solid top coating used for automobiles. Also the top coating containing the curable resin of the present invention is more excellent in acid rain resistance and scratch resistance, which have recently been desired to more improve in the use of top coatings for automobiles, than the acrylic-melamine coatings which has been generally and widely used.

It could be considered that the reason why the curable resin of the present invention is excellent in acid rain resistance is that the coating film of the curable resin of the present invention is not cured (crosslinked) by the formation of ether bond alike in the case of the acrylic-melamine coatings, but cured by the formation of siloxane bond which is excellent in chemical resistance. Also, though the cause that the scratch resistance can be given to the curable resin is not clear, the cause could be considered that the backbone of the curable resin is excellent in elastic restoration.

The composition of the present invention comprises the vinyl polymer (a) containing in one molecule at least one, preferably from 2 to 10, silyl group having the formula (IV):

(IV)

and the curable resin (b) as mentioned above.

In the formula (IV), $R^6$ and $R^7$ are the same or different and each is a hydrogen atom or a hydrocarbon group having 1 to 10 carbon atoms selected from an alkyl group such as methyl group or ethyl group, an aryl group such as phenyl group and an aralkyl group such as benzyl group; each Y is a halogen atom or a group selected from an alkoxy group such as methoxy group, ethoxy group or butoxy group, an acyloxy group such as acetoxy group, a thioalkoxy group such as aminoxy group or phenoxy group and an amino group, and at least one Y is an alkoxy group os phenoxy group; and a is 1, 2 or 3.

Examples of the vinyl monomer, for instance, a methacrylic monomer such as methyl methacrylate, n-butyl methacrylate or iso-butyl methacrylate, an acrylic monomer such as n-butyl acrylate or 2-ethylhexyl acrylate, a hydrolyzable silyl group-containing vinyl monomer such as γ-trimethoxysilylpropyl methacrylate, styrene, acrylamide, and the like.

The vinyl polymer having at least one silyl group (a) can be prepared in a manner, for instance, described in Japanese Unexamined Patent Publication No. 54-36395, or the like.

The composition of the present invention comprises 5 to 95 parts by weight, preferably from 10 to 70 parts by weight, of the vinyl polymer (a) and 95 to 5 parts by weight, preferably from 30 to 90 parts by weight, of the curable resin (b), the total amount of the curable resin (b) and the vinyl polymer (a) being 100 parts by weight. When the amount of the vinyl polymer is less than 5 parts by weight, it tends to lower the effect for improving the acid resistance. On the other hand, when the amount of the vinyl polymer (a) is more than 95 parts by weight, it tends to lower the effect for improving the scratch resistance.

When the silyl group-containing vinyl polymer (a) is blended with the curable resin (b), the obtained composition can be improved in acid rain resistance and hardness.

The composition of the present invention can further contain other resins and other coatings. For instance, when an epoxy resin, a polyester alkyd resin or an acrylic polyol resin is blended with the composition of the present invention, the obtained composition can be improved in flexibility and solvent resistance. Also, when a melamine-alkyd coating or a melamine-acrylic coating is blended with the composition of the present invention, the obtained composition can be improved in acid rain resistance and scratch resistance.

It is preferable that the other component is blended with the composition of the present invention in an amount of not more than 50 parts by weight, based on 100 parts by weight of the total resin solids from the viewpoints of the characteristic physical properties of the composition of the present invention.

The composition of the present invention can further contain a known additive such as a solvent, dehydrating agent, antoxidant, leveling agent or pigment.

The curable resin or the composition containing the resin of the present invention can be cured by using a known curing catalyst. Examples of the curing catalyst are, for instance, an organotin compound such as dibutyltin dilurate or tin octoate, and acid compound such as p-toluenesulfonic acid or an acid phosphoric ester, an amine compound such as ethylene diamine, isophorone diamine or N,N-dimethyldodecylamine, and the like.

It is preferable that the amount of the curing catalyst is from 0.005 to 10 parts by weight, more preferably from 0.1 to 8 parts by weight, based on 100 parts by weight of the curable resin (a). The curing of the curable resin (a) can proceed rapidly at room temperature without using the curing catalyst. It is possible that the curable resin (a) can be cured further rapidly by heating to 80° to 160° C.

The curable resin (a) or the composition of the present invention is excellent in acid rain resistance, scratch resistance, flexibility, weatherability, and the like, and is suitable for use as, particularly exterior coating agents.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

REFERENCE EXAMPLE 1

Preparation of hydrolyzable silyl group-containing acrylic copolymer

A reactor equipped with a stirrer, a thermometer, a nitrogen inlet tube and a condenser was charged with 200 g of "Solvess 100" commercially available from Exxon Company and the temperature was elevated to 110° C. Then, a mixture of 177 g of n-butyl methacrylate, 177 g of methyl methacrylate, 240 g of trimethoxysilylpropyl methacrylate, 6 g of acrylamide, 32 g azobisisobutyronitrile and 64 g of xylene was continuously added to the reactor for 5 hours with stirring under nitrogen gas. Then, a mixture of 4 g of azobisisobutyronitrile and 40 g of xylene was continuously added for 2 hours, and the post-polymerization was conducted for 1 hour.

The obtained reaction mixture was diluted with xylene to give a hydrolyzable silyl group-containing acrylic copolymer solution (1) having a solid concentration of 60%. The obtained silyl group-containing acrylic copolymer had a number average molecular weight of 3,000 and a solution viscosity of 200 cps (at 23° C.).

EXAMPLE 1

A reactor equipped with a stirrer, a thermometer, a nitrogen inlet tube and a condenser was charged with 284 g of Placcel FA-3 (commercially available from Daicel Chemical Industries, Ltd., polycaprolactone acrylate, $\overline{M}n$: 458), 127 g of 3-isocyanatepropyltrimethoxysilane and 200 g of xylene and the mixture was reacted at 100° C. for 2 hours with stirring under nitrogen gas.

Figure 1:
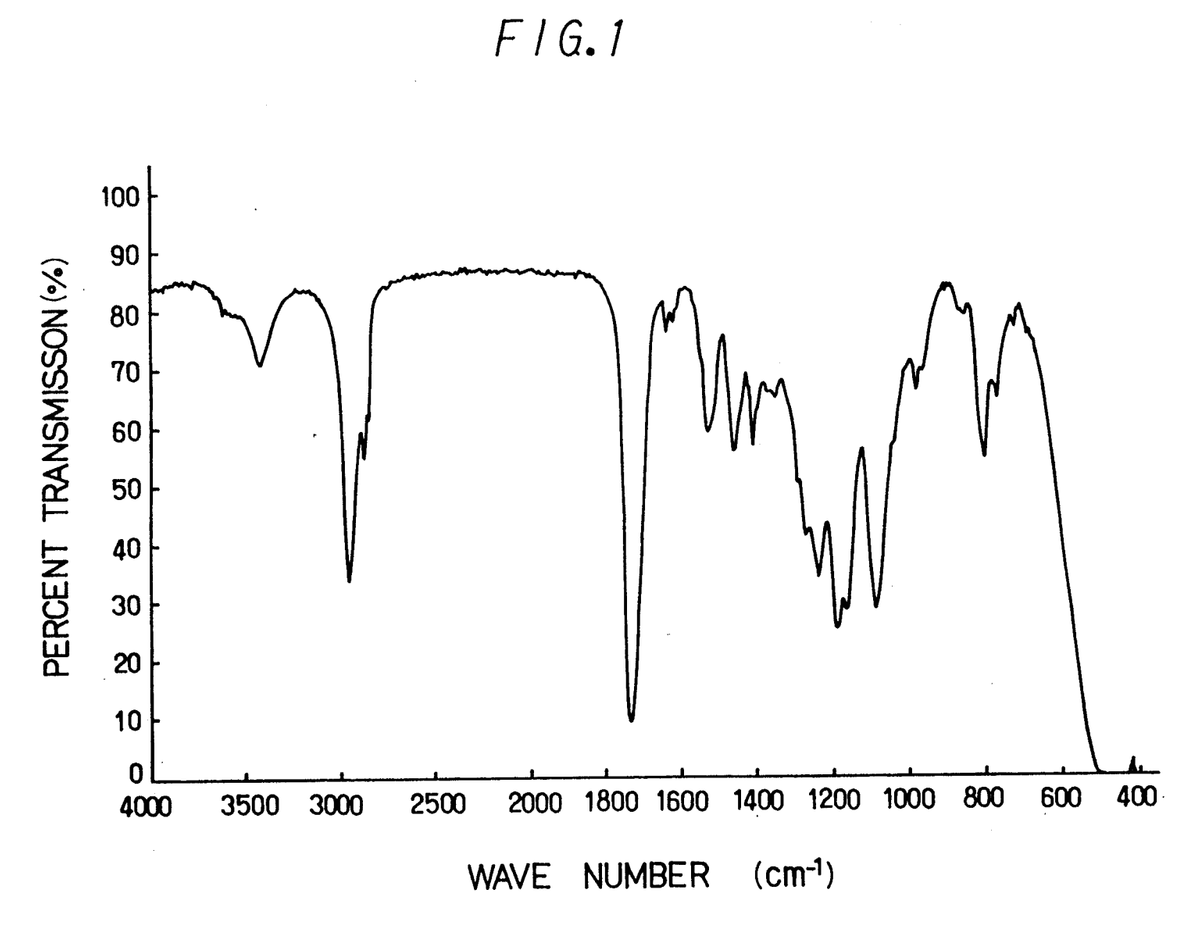
FIG. 1 is a chart of the infrared absorption spectrum of a reaction product (i) obtained in Example 1.

In the infrared absorption spectrum (IR) of the obtained product (i), the absorption based on NCO (2270 $cm^{-1}$) disappeared completely and the absorption based on urethane bond (1540 $cm^{-1}$) was seen. Also, the absorption based on acryloyl group (1630 to 1640 $cm^{-1}$) remained. The chart of IR spectrum of the reaction product (i) is shown in FIG. 1.

Then, after the reaction temperature was dropped to 30° C., 116 g of 3-aminopropyltrimethoxysilane was added to the reactor and the reaction was conducted for 1 hour, and was further continued at 60° C. for 30 minutes.

Figure 2:
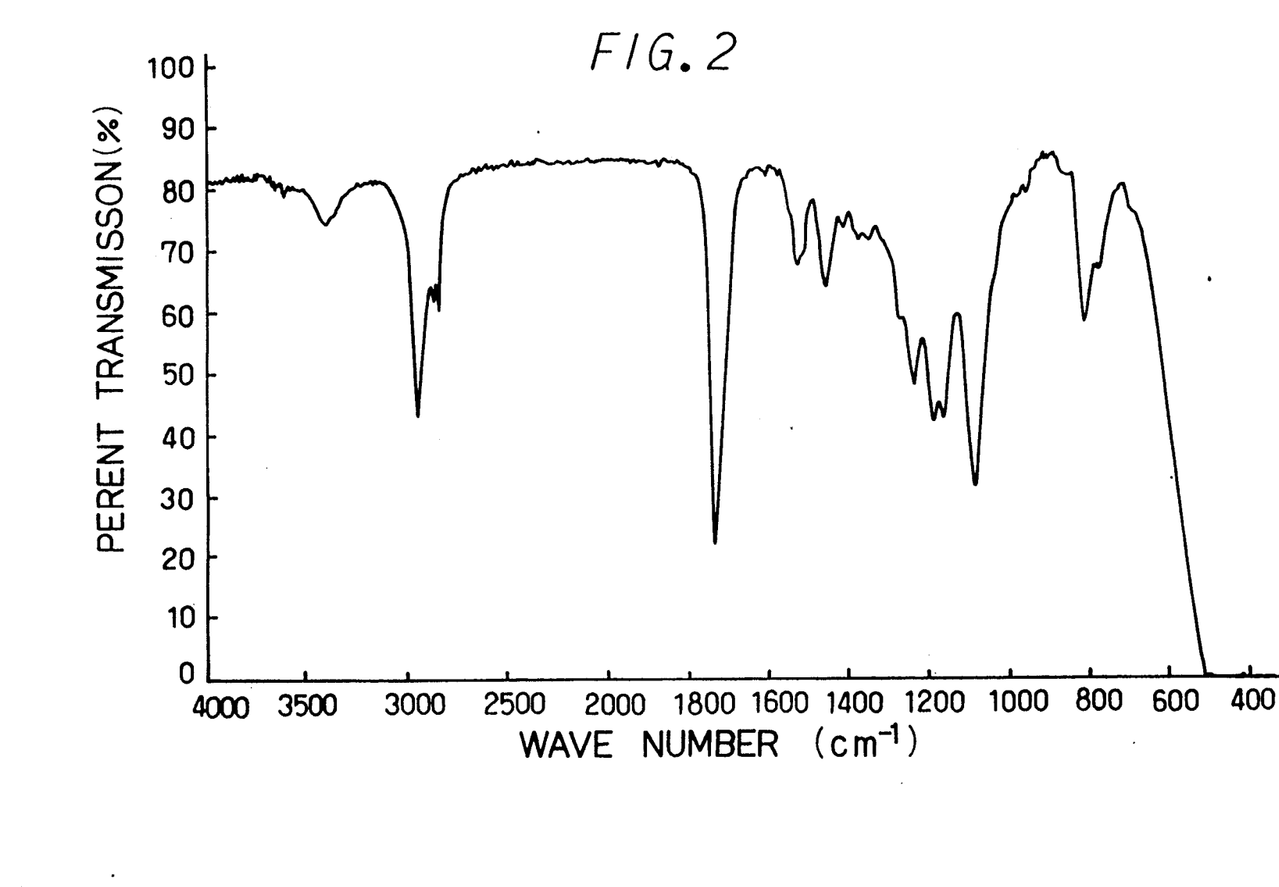
FIG. 2 is a chart of the infrared absorption spectrum of a reaction product (ii) obtained in Example 1.

In IR of the reaction product (ii), the absorption based on acryloyl group (1630 to 1640 $cm^{-1}$) disappeared. The chart of IR spectrum of the reaction product (ii) is shown in FIG. 2.

Subsequently, after the reaction temperature was dropped to 30° C., 73 g of cyclohexyl isocyanate was gradually added through a dropping funnel, and the reaction was conducted at 60° C. for 30 minutes after completing the addition. The reaction product diluted with xylene to give a curable resin solution (1) having a solid concentration of 60%.

Figure 3:
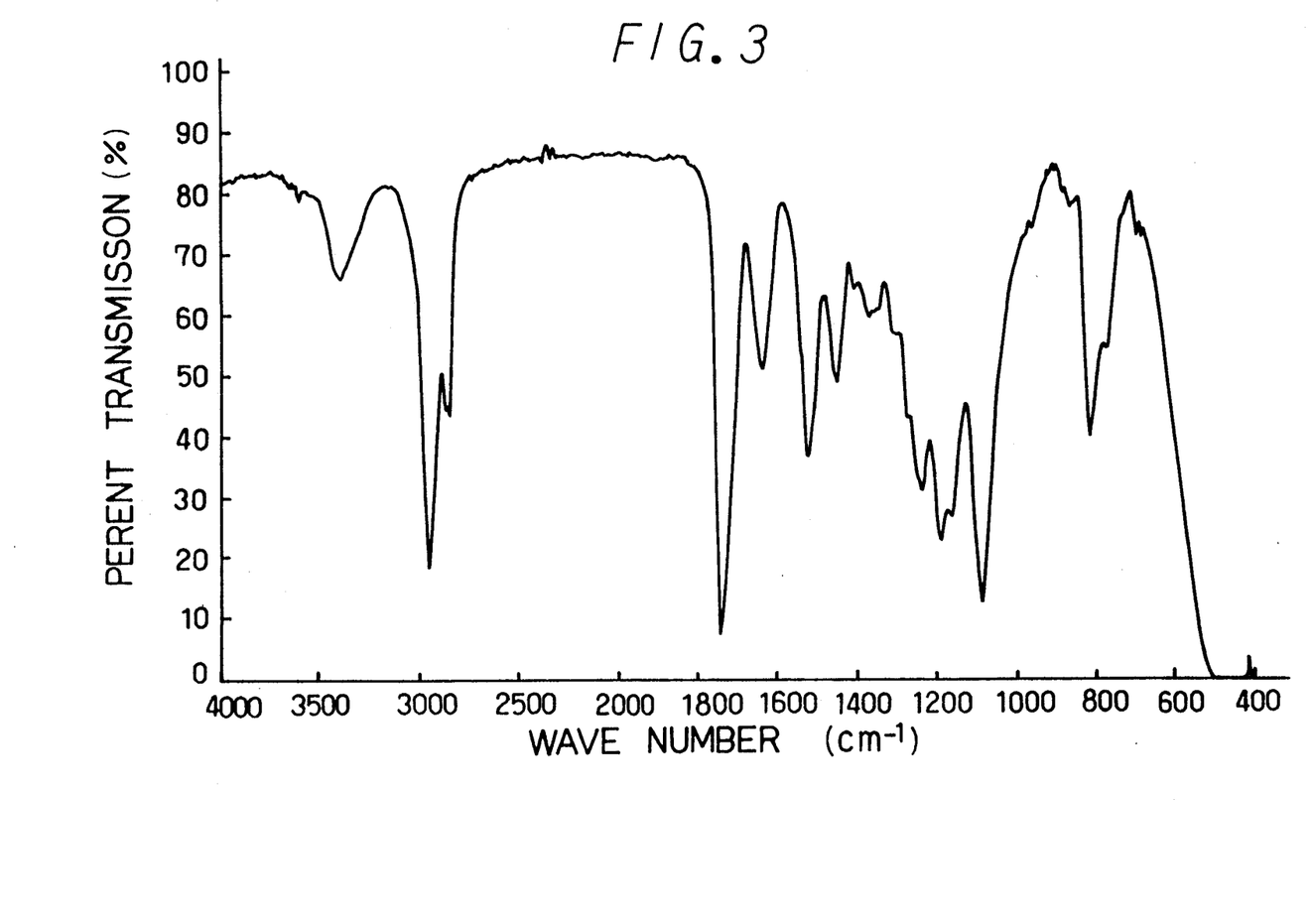
FIG. 3 is a chart of the infrared absorption spectrum of a curable resin obtained in Example 1.

In the IR of the obtained curable resin, the absorption based on urea bond (1640 $cm^{-1}$) was seen. The chart of IR spectrum of the curable resin is shown in FIG. 3. The curable resin has a number average molecular weight of 1000, measured by gel permeation chromatography (GPC).

There was mixed 100 parts of the curable resin solution (1) (solid concentration: 60%) with 0.5 part of dibutyltin dilaurate, and the mixture was diluted with "Solvesso 100" to give a clear coating having a suitable viscosity for using as a coating.

A black melamine-acrylic enamel was spray-coated on a plate (30 cm × 10 cm × 0.08 mm) coated with an electrodeposition intermediate coating so as to give a dry film thickness of 10 to 15 μm, the film was allowed to stand for 1 minute, then the clear coating was spray-coated on the film so as to give a dry film thickness of 40 to 50 μm. The film was allowed to stand for 5 minutes, it was baked at 140° C. for 30 minutes, and it was allowed to stand at room temperature for one day.

As to the obtained test piece or the curable resin solution (1), the following physical properties were estimated.

Solution viscosity

A viscosity of the curable resin solution having a solid concentration of 60% was measured at 23° C. by using a Brookfield viscometer.

Pencil hardness

The pencil hardness of the film is measured according to Japanese Industrial Standards (JIS) K 5400.

Acid resistance

A 20°-gloss of the film is measured. The test piece was dipped in a 1% solution of sulfuric acid for 24 hours, and then a 20°-gloss of the film is measured. The gloss retention is characterized by the following equation:

$$\text{Gloss retention} = \frac{20° - \text{gloss of the film after dipping}}{20° - \text{gloss of the film before dipping}} \times 100(\%)$$

The higher the gloss retention, the more excellent the acid resistance.

Scratch resistance

The test piece is horizontally set, an abrasive of 1.2% of a loam having an abrasive grain size of #8 provided in JIS, 1.2% of a loam having an abrasive grain size of #11 provided in JIS, 0.6% of kaoline, 1.0% of a neutral detergent and 96.0% of water was coated on the film of the test piece, with which a kraft paper is covered (a diameter of contact area: 5 cm, a load: 22 $g/cm^2$). The kraft paper was stroked on the film. The lightness of the film which is not stroked, the lightness of the film which is stroked 12 times, and the lightness of the film which is stroked 100 times are measured by using differential colorimeter. The scratch resistance is estimated according to the difference (ΔL) between the lightness of the film which is not stroked and the lightness of the film which is stroked 12 times or 100 times. The smaller the ΔL, the more excellent the scratch resistance.

Bending by mandrel

A test piece (30 cm × 10 cm × 0.08 mm) is prepared by coating a mild steel plate with the curable resin or composition so as to get a dry film thickness of 50 μm. The test piece is bended by using a mandrel tester commercially available from Ericksen Corp. and a length (cm) of crack is measured.

The results are shown in Table 1.

EXAMPLE 2

The procedure of Example 1 was repeated except that 49 g of hexamethylene diisocyanate was used instead of 73 g of cyclohexyl isocyanate to give a curable resin solution (2) containing a solid concentration of 60%.

In the IR of the curable resin, the absorption based on urea bond (1640 cm$^{-1}$) was seen. The curable resin had a number average molecular weight of 1500 measured by GPC.

The physical properties of the curable resin solution (2) and the film were measured in the same manner as in Example 1.

The results are shown in Table 1.

EXAMPLE 3

The procedure of Example 1 was repeated except that 98 g of tri(6-isocyanatehexyl)isocyanurate was used instead of 73 g of cyclohexyl isocyanate to give a curable resin solution (3) having a solid concentration of 60%.

In the IR of the obtained curable resin, the absorption based on urea bond (1640 cm$^{-1}$) was seen. The curable resin has a number average molecular weight of 3,000 measured by GPC.

The test piece was prepared in the same manner as in Example 1.

As to the obtained film and the resin solution (3) the physical properties were measured in the same manner as in Example 1.

The results are shown in Table 1.

EXAMPLE 4

A reactor equipped with a stirrer, a thermometer, a nitrogen inlet tube and a condenser was charged with 407.2 g of polymethylvalerolactone acrylate (commercially available from Kabushiki Kaisha Kuraray, $\overline{M}n=1080$), 77.3 g of 3-isocyanatepropyltrimethoxysilane and 200 g of xylene, and the reaction was conducted at 100° C. for 2 hours with stirring under nitrogen gas.

In the IR of the reaction product, the absorption based on —NCO (2270 cm$^{-1}$) completely disappeared, the absorption based on urethane bond was seen, and the absorption based on acryloyl group (1630 to 1640 cm$^{-1}$) remained.

Then, the reaction temperature was dropped to 30° C., to which 70.9 g of 3-aminopropyltrimethoxysilane was added, and the reaction was conducted for 1 hour and then was continued at 60° C. for 30 minutes.

In the IR of the reaction product, the absorption based on acryloyl group (1630 to 1640 cm$^{-1}$) disappeared.

Then, the reaction temperatures was dropped to 30° C., and 44.6 g of cyclohexylisocyanate was gradually added through a dropping funnel to the reaction system. After completing the addition, the reaction was conducted at 60° C. for 30 minutes and the reaction product was diluted with xylene to give a curable resin solution (4) having a solid concentration of 60%.

In the IR of the obtained curable resin, the absorption based on urea bond (1640 cm$^{-1}$) was seen. The curable resin has a number average molecular weight of 1600 measured by GPC.

The test piece was prepared in the same manner as in Example 1.

The physical properties of the film and the curable resin solution (4) were measured in the same manner as in Example 1.

The results are shown in Table 1.

COMPARATIVE EXAMPLE 1

A test price was prepared in the same manner as in Example 1 except that a commercial melamine-acrylic clear coating was used instead of the clear coating obtained in Example 1.

The physical properties of the film were measured in the same manner as in Example 1.

The results are shown in Table 1.

TABLE 1

| Ex. No. | Solution viscosity (60%) (cps) | Pencil hardness | Acid resistance (Gross retention) | Scratch resistance | | Bending by mandrel (cm) |
| --- | --- | --- | --- | --- | --- | --- |
| | | | | 20 times | 100 times | |
| 1 | 40 | HB | 80 | 0.1 | 1.3 | 0 |
| 2 | 70 | HB | 85 | 0.1 | 1.0 | 0 |
| 3 | 100 | HB | 90 | 0.1 | 0.8 | 0 |
| 4 | 60 | 2B | 95 | 0.3 | 1.5 | 0 |
| Com. Ex. 1 | — | H | 20 | 5.0 | 11.0 | 10 |

EXAMPLES 5 TO 7 AND COMPARATIVE EXAMPLE 2

The curable resin solution (1) was mixed with the hydrolyzable silyl group-containing acrylic copolymer obtained in Reference Example 1 in amounts shown in Table 2 to give a composition.

The test piece was prepared in the same manner as in Example 1 except that the obtained composition was used instead of the curable resin.

The physical properties of the film and the resin solution were measured in the same manner as in Example 1.

The results are shown in Table 2.

TABLE 2

| Ex. No. | Curable resin solution (1) (part) | Hydrolyzable silyl group-containing acrylic copolymer solution (1) (part) | Solution viscosity (60%) (cps) | Pencil hardness | Acid resistance (Gross retention) | Scratch resistance | | Bending by mandrel (cm) |
| --- | --- | --- | --- | --- | --- | --- | --- | --- |
| | | | | | | 20 times | 100 times | |
| 5 | 75 | 25 | 50 | F | 90 | 0.5 | 2.2 | 0 |
| 6 | 50 | 50 | 70 | H | 100 | 2.3 | 4.1 | 0 |
| 7 | 25 | 75 | 100 | H | 100 | 3.5 | 7.0 | 1 |
| Com. | 0 | 100 | 200 | H | 100 | 4.0 | 9.5 | 10 |

TABLE 2-continued

| Ex. No. | Curable resin solution (1) (part) | Hydrolyzable silyl group-containing acrylic copolymer solution (1) (part) | Solution viscosity (60%) (cps) | Pencil hardness | Acid resistance (Gross retention) | Scratch resistance 20 times | Scratch resistance 100 times | Bending by mandrel (cm) |
|---|---|---|---|---|---|---|---|---|
| Ex. 2 | | | | | | | | |

In addition to the ingredients used in the Examples, other ingredients can be used in the Examples as set forth in the specification to obtain substantially the same results.

What we claim is:

1. A curable resin having a number average molecular weight of 600 to 6000 and at least two hydrolyzable silyl groups in one molecule, which is prepared by
    (i) reacting an aliphatic polyester resin (A) having, in one molecule, both acryloyl group and alcoholic hydroxyl group on the polymer ends with an isocyanate silane compound (B) having the formula (I):

wherein $R^1$ is a bivalent hydrocarbon group having 1 to 10 carbon atoms selected from the group consisting of an alkylene group, an arylene group and an aralkylene group, $R^2$ is an alkyl group having 1 to 10 carbon atoms, each $X^1$ is a hydrolyzable group and m is 1, 2 or 3, whereby amino groups in said compound (B) are reacted with said hydroxyl groups to give a reaction product (i);
    (ii) reacting the obtained reaction product (i) with an aminosilane compound (C) having the formula (II):

wherein $R^3$ is a bivalent hydrocarbon group having 1 to 10 carbon atoms selected from the group consisting of an alkylene group, an arylene group and an aralkylene group, $R^4$ is an alkyl group having 1 to 10 carbon atoms, each $X^2$ is a hydrolyzable group and n is 1, 2 or 3, whereby amino groups in said compound (C) are reacted with said acryloyl groups to give an aminosilane-modified resin (ii), and
    (iii) reacting the aminosilane-modified resin (ii) with a monofunctional organic isocyanate compound (D-1) having the formula (III):

wherein $R^5$ is a monovalent hydrocarbon group having 1 to 25 carbon atoms selected from the group consisting of an alkyl group, an aryl group and an aralkyl group, a group of the formula: $(CH_3O)_3-Si-(CH_2)_3-$ and a group of the formula: $(C_2H_5O)_3-Si-(CH_2)_3-$ and/or a polyfunctional organic isocyanate compound (D-2) in the substantial absence of water, whereby isocyanate groups in said compound (D-1) and/or said compound (D-2) are reacted with the amino groups in said compound (C) attached to said acryloyl groups.

2. The curable resin of claim 1, wherein the backbone of said curable resin is substantially polycaprolactone.

3. The curable resin of claim 1, wherein the backbone of said curable resin is substantially polyvalerolactone.

4. The curable resin of claim 1, wherein, in the formula (I), the group $X^1$ is methoxy group and the integer m is 3.

5. The curable resin of claim 1, wherein, in the formula (II), the group $X^2$ is methoxy group and the integer n is 3.

6. The curable resin of claim 1, wherein, in the formula (I), the group $X^1$ is methyl group and the integer m is 3 and, in the formula (II), the group $X^2$ is methoxy group and the integer n is 3.

7. The curable resin of claim 1, wherein, in the formula (I), the group $R^2$ is methyl group, the group $X^1$ is methoxy group and the integer m is 2.

8. The curable resin of claim 1, wherein, in the formula (II), the group $R^4$ is methyl group, the group $X^2$ is methoxy group and the integer n is 2.

9. The curable resin of claim 1, wherein, in the formula (I), the group $R^2$ is methyl group, the group $X^1$ is methoxy group and the integer m is 2 and, in the formula (II), the group $R^4$ is methyl group, the group $X^2$ is methoxy group and the integer n is 2.

10. A composition comprising:
    (a) a silyl group-containing vinyl polymer having, in one molecule, at least one silyl group represented by the formula (IV):

wherein $R^6$ and $R^7$ are the same or different and each is a hydrogen atom or a monovalent hydrocarbon group having 1 to 10 carbon atoms selected from the group consisting of an alkyl group, an aryl group and an aralkyl group, each Y is a halogen atom, an alkoxy group, an acyloxy group, an aminoxy group, a phenoxy group, a thioalkoxy group or an amino group and at least one Y is an alkoxy group or phenoxy group, a is 1, 2 or 3, and
    (b) a curable resin having a number average molecular weight of 600 to 6000 and at least two hydrolyzable silyl groups in one molecule, which is prepared by
    (i) reacting an aliphatic polyester resin (A) having, in one molecule, both acryloyl group and alcoholic hydroxyl group on the polymer ends with an isocyanate silane compound (B) having the formula (I):

wherein $R^1$ is a bivalent hydrocarbon group having 1 to 10 carbon atoms selected from the group consisting of an alkylene group, an arylene group and an aralkylene group, $R^2$ is an alkyl group having 1 to 10 carbon atoms, each $X^1$ is a hydrolyzable group and m is 1, 2 or 3, whereby isocyanate groups in said compound (B) are reacted with said hydroxyl groups to give a reaction product (i);

(ii) reacting the obtained reaction product (i) with an aminosilane compound (C) having the formula (II):

$$H_2N-R^3-\underset{\underset{X_n^2}{|}}{Si}-(R^4)_{3-m} \qquad (II)$$

wherein $R^3$ is a bivalent hydrocarbon group having 1 to 10 carbon atoms selected from the group consisting of an alkylene group, an arylene group and an aralkylene group, $R^4$ is an alkyl group having 1 to 10 carbon atoms, each $X^2$ is a hydrolyzable group and n is 1, 2 or 3, whereby amino groups in said compound (C) are reacted with said acryloyl groups to give an aminosilane-modified resin (ii), and (iii) reacting the aminosilane-modified resin (ii) with a monofunctional organic isocyanate compound (D-1) having the formula (III):

$$OCN-R^5 \qquad (III)$$

wherein $R^5$ is a monovalent hydrocarbon group having 1 to 25 carbon atoms selected from the group consisting of an alkyl group, an aryl group and an aralylene group, a group of the formula: $(CH_3O)_3-Si-(CH_2)_3-$ and a group of the formula: $(C_2H_5O)_3-Si-(CH_2)_3-$ and/or a polyfunctional organic isocyanate compound (D-2) in the substantial absence of water, whereby isocyanate groups in said compound (D-1) and/or said (D-2) are reacted with the amino groups in said compound (C) attached to said acryloyl groups.

* * * * *